United States Patent [19]

Wiener

[11] Patent Number: 5,121,431
[45] Date of Patent: Jun. 9, 1992

[54] PROCESSOR METHOD OF MULTIPLYING LARGE NUMBERS

[75] Inventor: Michael J. Wiener, Nepean, Canada

[73] Assignee: Northern Telecom Limited, Montreal, Canada

[21] Appl. No.: 547,364

[22] Filed: Jul. 2, 1990

[51] Int. Cl.$^5$ .................... H04L 9/00; H04L 9/30; G06F 7/52

[52] U.S. Cl. .................... 380/49; 380/30; 380/50; 364/757; 364/760

[58] Field of Search .................... 364/200, 900, 750.5, 364/754, 757, 758, 759, 760; 380/1, 30, 49, 50

[56] References Cited

U.S. PATENT DOCUMENTS 4,831,577 5/1989 Wei et al. .................... 364/757

*Primary Examiner*—Bernarr E. Gregory
*Attorney, Agent, or Firm*—R. John Haley

[57] ABSTRACT

For a public key encryption system, for example using the RSA algorithm, large numbers, for example each of the order of 256 bits and represented by a plurality of sequentially stored words, must be multiplied together. To achieve this at high speed there is described a method using a digital signal processor which has two accumulators for accumulating products of words, each accumulator having a capacity of more than twice the size of the words which are multiplied. The two accumulators are used alternately for accumulating partial products of the same significance in a multiplication of two numbers. Pointers to the sequentially stored words are incremented in opposite directions to point to words to be multiplied to form partial products of the same significance, and the pointer incrementing directions are changed for sets of partial products of increasing significance. The pointer control and alternating use of the accumulators enables a significant increase in multiplication speed to be achieved.

19 Claims, 2 Drawing Sheets

Fig. 1

|  | XC | XB | XA | X9 | . | . | . | X3 | X2 | X1 |
|  | YC | YB | YA | Y9 | . | . | . | Y3 | Y2 | Y1 |
|---|---|---|---|---|---|---|---|---|---|---|
|  | PC1 | PB1 | PA1 | P91 | . | . | . | P31 | P21 | P11 |
|  | PC2 | PB2 | PA2 | P92 | . | . | . |     | P22 | P12 |
|  | PC3 | PB3 | PA3 | P93 | . | . | . |     |     | P13 |
|  |     |     |     |     |   |   |   |     |     |     |
|  |     |     | PCB | P3B | P2B | P1B |   |     |     |     |
|  |     | PCC | PBC | P2C | P1C |   |   |     |     |     |
| R18 | R17 | R16 | . | RD | RC | RB | RA | R9 | . | R3 | R2 | R1 |

PROCESSOR METHOD OF MULTIPLYING LARGE NUMBERS

This invention relates to a method of multiplying large numbers in a processor such as an integrated circuit digital signal processor.

BACKGROUND OF THE INVENTION

Public key encryption systems have been proposed for encrypting information for security and authentication purposes. The most widely known and accepted public key encryption system, known as RSA after its inventors Rivest, Shamir, and Adleman, operates in accordance with an algorithm which is described in Rivest et al. U.S. Pat. No. 4,405,829 issued Sep. 30, 1983 and entitled "Cryptographic Communications System and Method".

Briefly described, RSA uses two randomly chosen large prime numbers p and q, and determines their product n. A large number d is chosen so that d and the product $(p-1)*(q-1)$ have no common factor greater than one. A number e is determined such that $(e*d)$ modulo $((p-1)*(q-1)) = 1$. The notation "x modulo y" means the remainder of dividing x by y using integer division. The pairs of numbers (e, n) and (d, n) constitute a public key and a private key respectively. The security of the algorithm resides in the fact that the numbers p and q are very large (e.g. 100 decimal digits or more) so that n is extremely large, and there is no known efficient algorithm for factoring such extremely large numbers.

To encrypt using RSA, information is broken into blocks each of which can be represented as an integer from 1 to $n-1$. Each such integer T is raised to the power e, modulo n, to produce an encrypted number C. This is decrypted by raising it to the power d, modulo n. Thus $C = T^e$ modulo n, and $T = C^d$ modulo n. The calculations represented by these equations can be performed by a process referred to as modular exponentiation, which is the process of raising a first large positive integer to the power of a second large positive integer, and determining the result modulo a third large positive integer.

A problem with modular exponentiation is that it can be unacceptably slow, even when using very fast processing devices. For effective use of RSA, modular exponentiation of binary numbers of about 256 bits is typically required (a 512-bit RSA decryption can be effected using two 256-bit modular exponentiations). Such large numbers must each be treated in practical processors as multiple words, for example as 12 words each of 24 bits as described further below. The words of each number must be handled sequentially, so that processing of the numbers can involve a large number of sequential steps, and hence a considerable amount of time.

For example, the modular exponentiation process involves many multiplications of large numbers. To multiply one 12-word number as described above by another 12-word number involves $12^2 = 144$ multiplications of two 24-bit words, as well as numerous adding or accumulation steps and manipulation of the partial results which are produced by the multiplication and accumulation steps.

The speed with which such a multiplication of large numbers can be performed, and hence the speeds of the modular exponentiation process and the RSA encryption or decryption process, is thus dependent upon three factors, namely the speed of the processor, the size(s) of words which the processor can multiply and accumulate, and the speed with which the partial results are manipulated. The first two of these factors are determined by hardware constraints, and maximum speeds are effectively predetermined for a given processor. The third of these factors has been found to have a major impact on the overall multiplication speed, and is addressed by the present invention.

An object of this invention, therefore, is to provide an improved method of multiplying large numbers in a processor.

SUMMARY OF THE INVENTION

According to one aspect of this invention there is provided a method of multiplying two numbers, each represented by a plurality of words each of a plurality of bits, in a processor comprising two accumulators, comprising the steps of: forming partial products in order of increasing significance by multiplying words of one number by words of the other number; accumulating partial products of like significance in an accumulator, the two accumulators being used alternately for consecutive accumulations of partial products of increasing significance; and between the consecutive accumulations of partial products using the two accumulators, deriving a word of a product of the two numbers from a lower order part of the most recently used accumulator, and transferring an accumulated number from a higher order part of that accumulator into a lower order part of the other accumulator for accumulation with the partial products of next higher significance.

Thus in accordance with this aspect of the invention two accumulators are used alternately for consecutive accumulations of partial products of increasing significance. This alternating use of two accumulators enables the manipulation of partial results, between successive accumulations of partial products of the same significance, to be carried out more rapidly than if a single accumulator is used, thereby facilitating an increase in the speed of multiplication.

For accommodating accumulated partial products in a particularly rapid manner, preferably each accumulator has a capacity greater than twice the size of each word, and the step of transferring an accumulated number from a higher order part of the most recently used accumulator into a lower order part of the other accumulator comprises transferring the accumulated number from two highest order parts (e.g. A2, A1) of the most recently used accumulator into two lowest order parts (e.g. B1, B0) of the other accumulator.

The Motorola DSP56000 is a digital signal processor which provides two 56-bit accumulators for accumulating products of 24-bit words, and hence is particularly well suited to carrying out the method of this invention. However, it is arranged to multiply and accumulate signed fractional numbers in twos complement form. As explained more fully below, this results in the accumulated partial product words formed in the multiplication process not being appropriately positioned with respect to the word boundaries in the accumulators.

Accordingly, in a preferred embodiment of the method of the invention for application especially to the Motorola DSP56000 digital signal processor, in which for accommodating accumulated partial products each accumulator comprises a lowest order part (e.g. A0) for accommodating a lower order word, a higher order part (e.g. A1) for accommodating a higher order word, and a highest order part (e.g. A2) for accommodating carries from the higher order part, the steps of deriving a word of a product and transferring an accumulated number preferably comprise the steps, in sequence, of:

storing the contents of the highest order part (e.g. A2) of the most recently used accumulator (e.g. A) in the higher order part (e.g. B1) of the other accumulator (e.g. B) and zeroing the remainder of said other accumulator;

storing the contents of the higher order part (e.g. A1) of the most recently used accumulator in the lowest order part (e.g. B0) of the other accumulator and zeroing the higher order part (e.g. A1) of the most recently used accumulator;

shifting the contents of the most recently used accumulator right by one bit; and shifting the contents of said other accumulator (e.g. B) left by one bit, and deriving the word of the product from the lowest order part (e.g. A0) of the most recently used accumulator.

Desirably the words of each number are stored sequentially in memory, and the method further comprises the steps of: for sets of accumulated partial products of like significance, incrementing first and second pointers in opposite directions to point to respective memory locations of words of the numbers to be multiplied together to form the respective partial products of like significance; and for consecutive accumulations of partial products of increasing significance, changing the directions in which the first and second pointers are incremented. Especially when using the Motorola DSP56000, this enables the pointers to be updated throughout the multiplication process without requiring any additional instruction cycles, thereby considerably speeding up the overall multiplication speed.

Thus according to another aspect of this invention there is provided a method of multiplying two numbers, each stored in memory as a plurality of sequential words each of a plurality of bits, in a processor by accumulating in order of increasing significance partial products formed by multiplying words of one number by words of the other number, comprising the steps of: for sets of accumulated partial products of like significance, incrementing first and second pointers in opposite directions to point to respective memory locations of words of the numbers to be multiplied together to form the respective partial products of like significance; and for consecutive accumulations of partial products of increasing significance, changing the directions in which the first and second pointers are incremented.

According to a further aspect of this invention there is provided a method of multiplying a first number X, comprising m words X1 to Xm in order of increasing significance, and a second number Y, comprising n words Y1 to Yn in order of increasing significance, where m and n are integers greater than one, to form a product R comprising m+n words R1 to Rm+n in order of increasing significance, using a processor comprising two accumulators each having a capacity greater than twice the size of each word, comprising the steps of: (a) in consecutive steps i where i is an integer from 1 to m+n−1: selecting one of the accumulators when i is odd and the other of the accumulators when i is even; and forming and accumulating in the selected accumulator all of the products $Xj*Yk$, where j is an integer from 1 to m, k is an integer from 1 n, and j+k=i+1, in order of decreasing j when i is odd and in order of increasing j when i is even; (b) following each of the steps for which i<m+n−1: deriving a word Ri of the product R from a lower order part of the selected accumulator; and storing an accumulated number from a higher order part of the selected accumulator in a lower order part of the other accumulator for accumulation with products for the next value of i; and (c), following the step for which i=m+n−1: deriving the words Rm+n and Ri of the product R from respectively higher and lower order parts of the selected accumulator.

BRIEF DESCRIPTION OF THE DRAWINGS

The invention will be further understood from the following description with reference to the accompanying drawings, in which:

FIG. 1 is a diagram illustrating the multiplication of two large positive integers.

DESCRIPTION OF THE PREFERRED EMBODIMENT

Figure 2:
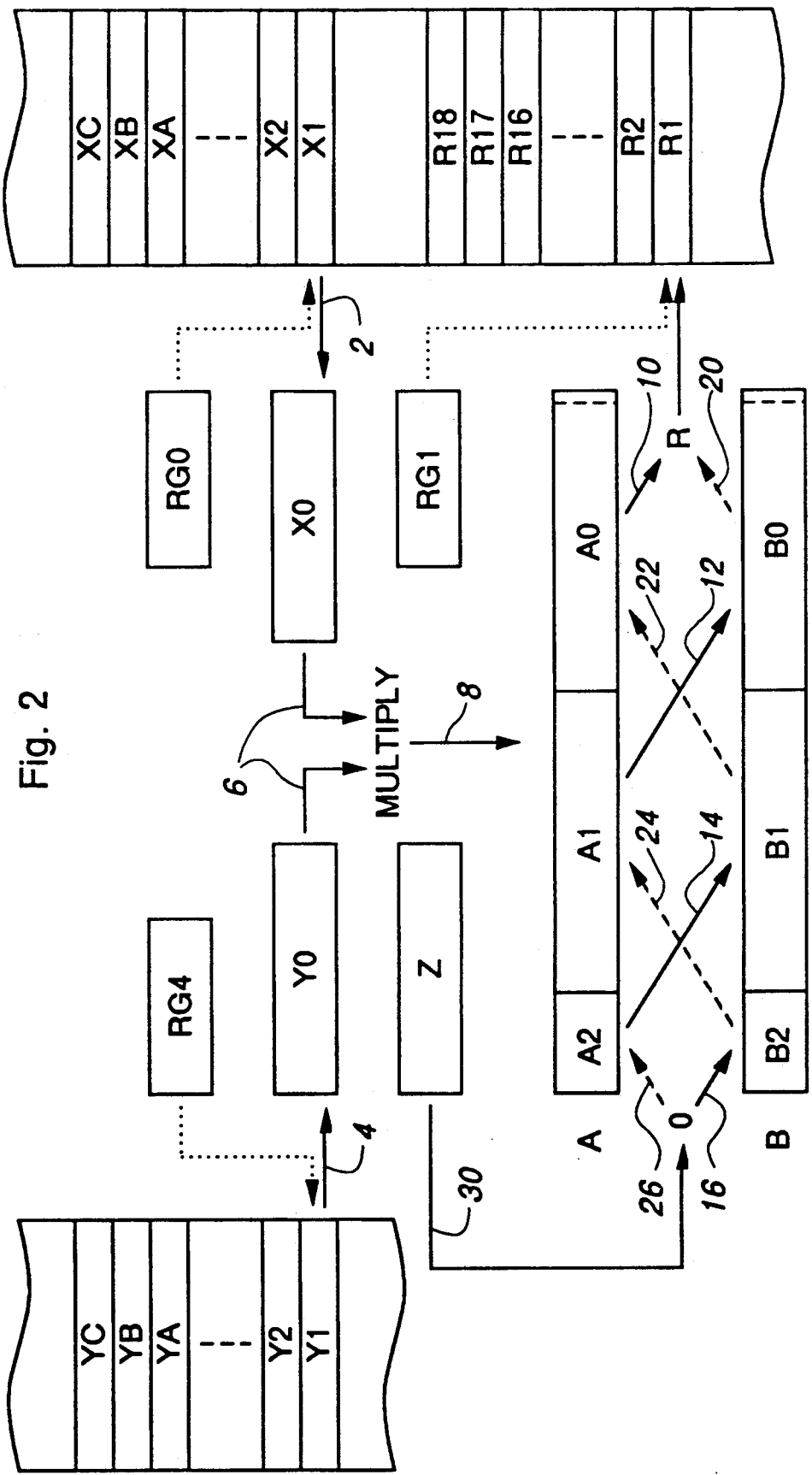
FIG. 2 is a diagram illustrating parts of a digital signal processor and their operation during a multiplication process in accordance with this invention and as represented by FIG. 1.

Consistent with the introduction relating to RSA, the following description relates to the multiplication of two numbers which are positive integers each of 12 words. The numbers are represented as X and Y, and the individual words of each number are represented as $Xw$ and $Yw$, where in each case w is a hexadecimal number from C (most significant word) to 1 (least significant word). As is well known, in hexadecimal notation C represents the decimal number 12, B represents the decimal number 11, and A represents the decimal number 10. Thus the number X is constituted by the 12 words XC XB XA X9 ... X2 X1.

The following description also assumes, by way of a presently preferred example of a commercially available processor, the use of a Motorola DSP56000 digital signal processor. The use of this digital signal processor is preferred because it is designed to perform a multiply/accumulate (mac) operation in a single instruction cycle, because it has two 56-bit accumulators which, being larger than twice the 24-bit word size, can conveniently accommodate successive accumulations, and because it enables two data movements to be performed simultaneously with each mac operation.

This processor treats the 24-bit words which it multiplies together as twoscomplement numbers not greater than one. In other words, in each 24-bit word the first, or most significant, bit represents the sign of the number which is represented by the word, the remaining 23 bits represent the magnitude of the number, and there is an implied binary point (equivalent to a decimal point, except that this is a binary number) immediately after the sign bit. When two such words are multiplied together, the processor produces a 48-bit product in twoscomplement form, of which the first or most significant bit is a sign bit and is immediately followed by an implied binary point, the following 46 bits represent the product of the two 23-bit magnitudes, and the final or least significant bit is necessarily zero. With accumulation of this product in the 56-bit accumulator, sign bit extension of the product is performed in conventional manner.

As already stated, the RSA system operates using positive integers. Consequently, to represent the numbers X and Y as described above only the 23 magnitude bits of each word are used, the sign bit always being zero to represent a positive number. Hence 12 words, rather than 11, are necessary to represent a 256-bit number.

Referring now to FIG. 1 of the drawings, there is illustrated the multiplication of the 12-word numbers X and Y. Each word X1 to XC is multiplied by each word Y1 to YC to produce partial products P, for a total of 144 multiplications. In FIG. 1 each partial product P is identified by two hexadecimal digits which represent the particular words of the numbers X and Y respectively which are multiplied to produce that partial product. Thus for example the partial product P11 is produced by multiplication of the word X1 by the word Y1, the partial product P21 is produced by multiplication of the word X2 by the word Y1, the partial product P12 is produced by multiplication of the word X1 by the word Y2, and so on. It is important to appreciate that, as each word Xw or Yw is represented by 23 bits, each partial product P must be represented by 46 bits, consisting of 23 magnitude bits in a lower order word and 23 magnitude bits in a higher order word.

The partial products P are summed vertically to produce a 24-word result R, whose individual 24-bit words are represented as R1 to R18 (hexadecimal 18 = decimal 24). More particularly, the result word R1 is constituted by the lower order word of the partial product P11; the result word R2 is constituted by accumulating the higher order word of the partial product P11 with the lower order words of the partial products P21 and P12; the result word R3 is constituted by accumulating the higher order words of the partial products P21 and P12 and the lower order words of the partial products P31, P22, and P13; and so on. It should be appreciated that these accumulations generally result in carries beyond the 46 magnitude bits of the partial products; as the accumulators of the processor have a total size of 56 bits, such carries are easily accommodated in a manner which will be clear from the description below. For ease of understanding and description here, these carries can be considered as being part of the higher order words being accumulated.

As has already been mentioned, the multiplication represented in FIG. 1 is effected sequentially, producing the partial products P in successive multiplication steps. More particularly, and as described further below, the words R1 to R17 of the result R are produced sequentially in this order (the word R18 being produced simultaneously with the word R17), the partial products P which are accumulated for the respective result words being produced by respective multiplications as and when necessary. Thus the multiplication of FIG. 1 is performed in the sequence of the accumulation columns, from right to left as illustrated in FIG. 1, to produce the result words R1 to R17 (and R18) in turn.

Accordingly, the multiplication process involves sequences of multiply and accumulate, or mac, operations corresponding to the columns of FIG. 1. After each such sequence, a process which is referred to below as "set-up" must be performed to remove the accumulated lower order word of the partial products of the respective column to constitute the respective result word, and to manipulate the accumulated higher order word to be accumulated with the lower order words of the partial products in the next column of FIG. 1. In addition, for each column pointers must be set up and updated to point to the locations in memory of subsequent words to be multiplied.

During the above multiplication process, there are 144 mac operations and 23 set-up operations, as well as the initialization steps and the final removal of the result words R17 and R18. Because each mac operation is performed in a single instruction cycle, whereas each set-up operation requires several instruction cycles, the speed of the overall multiplication is highly dependent upon the actual number of instruction cycles required for the set-up operation. As described below, this invention makes use of two accumulators, and provides alternating directions of the sequence in which partial products are formed and accumulated for the successive accumulation columns, to result in each set-up operation using only 4 instruction cycles. The overall multiplication in FIG. 1 therefore takes a little more than 4*23+144 instruction cycles. This is about 30% faster than the little more than 7*23+144 instruction cycles which would be required without these alternating directions and alternately used accumulators.

FIG. 2 diagrammatically illustrates parts of a Motorola DSP56000 digital signal processor, including the two 56-bit accumulators A and B, registers RG0, RG1, RG4, X0, Y0, and Z, and so-called X memory and Y memory. As shown by dotted lines, the registers RG0, RG1, and RG4 (normally referred to as R0, R1, and R4 in the DSP56000, but labelled differently here to avoid confusion with the result words) contain pointers to the locations in the X and Y memories at which words of respectively the number X, the product or result R, and the number Y are stored. The register Z is constituted by a register Y1 of the DSP56000 and contains the number zero as described below; the label Z is used here to avoid confusion with the word Y1 of the number Y.

As shown in FIG. 2, each of the accumulators A and B comprises three parts, e.g. A2, A1, and A0 for the accumulator A, which have a capacity of 8 bits, 24 bits, and 24 bits respectively, as illustrated in FIG. 2 by the relative sizes accorded to the parts of the accumulators. As already explained, the last bit in each accumulator, i.e. the last bit of the part A0 or B0, is necessarily a zero from any multiplication result which is stored in the accumulator, and is shown separated by a broken line in FIG. 2.

As should be appreciated from the above description, either of the accumulators A and B can be used to accumulate the result of a mac operation. For example, the result of a mac operation on two 24-bit words can be stored in the accumulator A, with the result that the accumulator has the product of these numbers added to its previous contents, this being performed in one instruction cycle. The part A2 of the accumulator serves in this case to accommodate carries from the part A1 as a result of successive accumulations.

In accordance with this invention, the two accumulators A and B are used alternately for accumulating the partial products of successive columns in the multiplication. In addition, as described further below, the setting and updating of the pointers in the registers RG are effected in a manner which does not require any additional instruction cycles. Consequently, each set-up operation which is necessary between successive sequences of mac operations (successive columns in FIG. 1) is achieved in only 4 instruction cycles, as described in detail below. In the following description, the accumulator A is assumed to be used first and is referred to as a first accumulator, and the accumulator B is referred to as a second accumulator.

Initially, the number zero is stored in the register Z, the memory locations of the words X1 and Y1 are stored in the registers RG0 and RG4 respectively, and the memory location for the result word R1 is stored in the register RG1. Thus these registers point to the memory locations as represented by the dotted lines in FIG. 2. As a final initialization step, the register X0 is loaded with the word from the X memory location pointed to by the register RG0 and this register is incremented, and the register Y0 is loaded with the word from the Y memory location pointed to by the register RG4 and this register is incremented, all of this taking place in a single instruction cycle which is represented by the code:

MOVE $_{109}$ X: (RGO)+,X0 $_{102}$ Y: (RG4)+,YO

In the above code, MOVE represents a data move instruction, X: and Y: denote simultaneous operations on the X and Y memories respectively, the parentheses denote indirect (pointer) addressing, the following- +signs denote post-incrementing of the registers, and X0 and Y0 denote the destination registers. Thus the registers X0 and Y0 are loaded as shown by arrows 2 and 4 respectively in FIG. 2, and after this instruction the registers RG0 and RG4 point to the words X2 and Y2 respectively.

The processor is thus set up to perform the operations necessary to produce the first result word R1 in the right-hand column of FIG. 1. This involves a single multiplication, of the words X1 and Y1 in the registers X0 and Y0, as shown by lines 6 in FIG. 2. The partial product P11 is stored in one of the accumulators, here assumed to be the accumulator A, as indicated by a line 8 in FIG. 2. As this accumulator has not been zeroed in the initialization steps above, a multiply instruction is performed rather than a mac instruction, as represented by the code:

MPY $_{103}$ X0,Y0,A $_{1012}$ Y: (RG4)−,Y0

In the same instruction cycle, as represented above, the register Y0 is loaded with the word Y2 in preparation for a subsequent mac operation as described below, and the register RG4 is post-decremented so that after this instruction cycle it points to the word Y1.

Thus the word X1 is multiplied by the word Y1 and the partial product P11 is stored in the accumulator A. From the above description, it should be appreciated that the part A0 of the first accumulator A, comprising 24 bits, now contains in its first 23 bit positions the lower order 23-bit word of the partial product P11, and a zero in its final bit position. The higher order 23-bit word of the partial product P11 is contained in the part A1 of the accumulator A, with a leading zero sign bit which is extended through the part A2 of the accumulator. In order to extract the result word R1 as part of the result R as shown by an arrow 10 in FIG. 2, and to set up the processor for the next sequence of mac operations (next column to the left in FIG. 1), the following code sequence of four instructions, referred to below as SET-UP B, is executed:

| MOVE | A2,B | |
| AND | Z,A | A1,B0 |
| ASR | A | |
| ASL | B | A0,X:(RG1)+ |

In the first cycle or step of this four-instruction sequence, the accumulated carry, having a size of 8 bits, contained in the first accumulator part A2 is moved into the least significant eight bits of the second accumulator part B1, as shown by an arrow 14 in FIG. 2. This instruction automatically zeroes the remaining parts of this second accumulator B, i.e. the parts B2 and B0 and the upper 16 bits of the part B1.

In the second step, the 24-bit word contained in the first accumulator part A1 is put into the second accumulator part B0, as shown by an arrow 12 in FIG. 2. At the same time the first register part A1 is zeroed by a logical AND function with the (zero) contents of the register Z, as shown by lines 30 and 16 in FIG. 2. The accumulated carry and higher order word from the first accumulator parts A2 and A1 are thus now stored in the second accumulator parts B1 and B0.

In the third step, an arithmetic right shift by one bit position is performed on the first accumulator A. This moves the 23 bits which represent the desired result word into the lowest 23 bit positions of the accumulator part A0, displacing the unwanted zero bit (47th bit after the implied binary point in the multiplication) which was contained in the least significant bit position of this part of the accumulator. A zero is moved from the least significant bit position of the accumulator part A1 into the most significant bit position of the accumulator part A0, so that the resulting 24-bit word in the accumulator part A0 is in the form of a twos-complement positive number having the magnitude of the desired result word.

In the fourth and final step of this sequence, the result word in the accumulator part A0 is stored at the location in the X memory pointed to by the register RG1, and this register is post-incremented to point to the next higher location for the next result word. At the same time, an arithmetic left shift by one bit position is performed on the second accumulator B to insert a zero in the least significant bit position of the accumulator part B0 and to align the contents of this accumulator correctly for accumulation with the partial products produced in the next sequence of mac operations.

For the second column (from the right) of the multiplication in FIG. 1, the two mac operations to form the products P21 and P12 and accumulate them are performed using the second accumulator B. This takes two instruction cycles, using the following code:

MAC $_{103}$ X0,Y0,B $_{104}$ X: (RG0)+,X0 $_{102}$ Y: (RG4)+,Y0

MAC $_{103}$ X0,Y0,B $_{104}$ X: (RG0)−,X0

In the first of these instructions, a mac operation is performed to multiply the word X1, still contained in the register X0, by the word Y2, which as described above was previously loaded into the register Y0, to form the partial product P12 and add this to the contents of the accumulator B to provide the accumulated result in this second accumulator. In this same instruction cycle, the word X2 pointed to by the register RG0 is loaded into the register X0 and the register RG0 is incremented, and the word Y1 pointed to by the register RG4 is loaded into the register Y0 and the register RG4 is incremented. In the second instruction cycle a mac operation is performed to multiply the word X2 in the register X0 by the word Y1 in the register Y0 to form the partial product P21 and add this to the contents of the accumulator B to provide the further accumulated result in this second accumulator B. In the same instruction cycle, the word X3 now pointed to by the register RG0 is loaded into the register X0 ready for the following sequence of mac operations (third column from the right in FIG. 1), and the register RG0 is then decremented.

Now the part B0 of the second accumulator B, comprising 24 bits, contains the lower order result word R2 in its first 23 bit positions and a zero in its final bit position. The higher order 23-bit word of the accumulated partial products P12 and P21 is contained in the part B1 of the accumulator B, with any carry and a leading zero sign bit being accommodated in the highest bit position of the part B1 and in the part B2 of the accumulator. In order to extract the result word R2 as part of the result R as shown by a dashed line arrow 20 in FIG. 2, and to set up the processor for the next sequence of mac operations (next column to the left in FIG. 1), the following code sequence of four instructions, referred to below as SET-UP A, is executed:

```
MOVE    B2,A
AND     Z,B      B1,A0
ASR     B
ASL     A        B0,X:(RG1)-
```

It can be seen that this is the same as the SET-UP B code already described above, except that the functions of the accumulators A and B are interchanged. The dashed line arrow 20, and further dashed line arrows 22, 24, and 26, in FIG. 2 illustrate the corresponding data movements, which in a similar manner to that described above result in the word R2 being stored in the proper location in the X memory and the accumulator A being properly set up for the accumulations of partial products in the next more significant column of FIG. 1.

At this time the registers X0 and Y0 contain the words X3 and Y1 respectively, and the registers RG0 and RG4 point to the words X2 and Y2 respectively. The next three mac operations, involving the products P31, P22, and P13 in this order, are performed using the first accumulator A with the following code:

```
MAC    X0,Y0,A   X:(RG0)-,X0   Y:(RG4)+,Y0
MAC    X0,Y0,A   X:(RG0)+,X0   Y:(RG4)-,Y0
MAC    X0,Y0,A                 Y:(RG4)-,Y0
```

This alternating use of the two accumulators is continued for all of the subsequent accumulation columns of the multiplication as shown in FIG. 1. Between successive sequences of mac operations, corresponding to respective accumulation columns in FIG. 1, the respective one of the two set-up code sequences as described above is performed. Also in consecutive columns the order or direction in which the partial products are formed and accumulated alternates between up and down as illustrated in FIG. 1. Thus as described above it is up for the second column from the right (P12, then P21), down for the third column (P31, then P22, then P13), with this alternation continuing (e.g. in the fourth column the products are formed in the order P14, P23, P32, and P41; in the fifth column the order is P51, P42, P33, P24, and P15f and so on). In the last two instructions of each such sequence of mac operations, the directions in which the pointer registers RG0 and RG4 are changed are reversed, so that these registers are prepared in each case for the following sequence of mac operations.

Thus following the code above, the code sequence continues in the form:

| SET-UP B (4 instruction cycles) | | | Extract R3 |
|---|---|---|---|
| MAC X0,Y0,B | X:(RG0)+,X0 | Y:(RG4)-,Y0 | Product P14 |
| MAC X0,Y0,B | X:(RG0)+,X0 | Y:(RG4)-,Y0 | Product P23 |
| MAC X0,Y0,B | X:(RG0)-,X0 | Y:(RG4)+,Y0 | Product P32 |
| MAC X0,Y0,B | X:(RG0)-,X0 | | Product P41 |
| SET-UP A (4 instruction cycles) | | | Extract R4 |
| MAC X0,Y0,A | X:(RG0)-,X0 | Y:(RG4)+,Y0 | Product P51 |
| MAC X0,Y0,A | X:(RG0)-,X0 | Y:(RG4)+,Y0 | Product P42 |
| MAC X0,Y0,A | X:(RG0)-,X0 | Y:(RG4)+,Y0 | Product P33 |
| MAC X0,Y0,A | X:(RG0)+,X0 | Y:(RG4)+,Y0 | Product P24 |
| MAC X0,Y0,A | | Y:(RG4)-,Y0 | Product P15 |
| SET-UP B (4 instruction cycles) | | | Extract R5 |
| MAC X0,Y0,B | X:(RG0)+,X0 | Y:(RG4)-,Y0 | Product P16 |
| MAC X0,Y0,B | X:(RG0)-,X0 | Y:(RG4)-,Y0 | Product P25 | and so on, ending in the form:

| SET-UP B (4 instruction cycles) | | | Extract R13 |
|---|---|---|---|
| MAC X0,Y0,B | X:(RG0)+,X0 | Y:(RG4)-,Y0 | Product P9C |
| MAC X0,Y0,B | X:(RG0)+,X0 | Y:(RG4)-,Y0 | Product PAB |
| MAC X0,Y0,B | X:(RG0)-,X0 | Y:(RG4)+,Y0 | Product PBA |
| MAC X0,Y0,B | | Y:(RG4)+,Y0 | Product PC9 |
| SET-UP A (4 instruction cycles) | | | Extract R14 |
| MAC X0,Y0,A | X:(RG0)-,X0 | Y:(RG4)+,Y0 | Product PCA |
| MAC X0,Y0,A | X:(RG0)+,X0 | Y:(RG4)-,Y0 | Product PBB |
| MAC X0,Y0,A | X:(RG0)+,X0 | | Product PAC |
| SET-UP B (4 instruction cycles) | | | Extract R15 |
| MAC X0,Y0,B | X:(RG0),X0 | Y:(RG4)+,Y0 | Product PBC |
| MAC X0,Y0,B | | Y:(RG4),Y0 | Product PCB |
| SET-UP A (4 instruction cycles) | | | Extract R16 |
| MAC X0,Y0,A | | | Product PCC |

After formation and accumulation of the last product PCC, for which the first accumulator A is used, the accumulator part A0 contains the result word R17 which is removed after a one bit shift right in the same manner as described above, and the accumulator part A1 contains the result word R18 which can be removed directly. At this time the contents of the part A2 of the accumulator A are necessarily zero.

Although the invention has been described above in relation to a specific example and application, it is generally applicable to the multiplication of large numbers. Thus the numbers X and Y need not contain the same number of words, and a different processor may be used which is designed to operate on unsigned numbers and without requiring the left and right bit shifts described above. However, no suitable processor for the latter situation is currently commercially available. Any such processor must have two accumulators as described above, which in order to accommodate the successive accumulations must have a capacity greater than twice the word size. If the accumulators each have a capacity of only twice the size of words normally handled by the processor, e.g. 48-bits for 24-bit words to be multiplied, then in order to accommodate the carries from successive accumulations the words of the numbers X and Y must be reduced to less than 24 bits each, necessitating additional manipulation during each set-up operation.

Considered generally, the number X can comprise m words X1 to Xm in order of increasing significance, and the number Y can comprise n words Y1 to Yn in order of increasing significance, where m and n are integers greater than one. These numbers are multiplied to form a product R which comprises m+n words R1 to Rm+n in order of increasing significance. The multiplication is performed using a processor comprising two accumulators each having a capacity greater than twice the size of each word. The multiplication comprises m+n−1 consecutive steps i, where i is an integer from 1 to m+n−1, corresponding to the accumulation columns of the multiplication (e.g. the multiplication in FIG. 1 has 23 accumulation columns). In each of these steps i all of the products Xj*Yk are formed and accumulated, where j is an integer from 1 to m, k is an integer from 1 to n, and j+k=i+1. When i is odd these products are formed and accumulated in one of the accumulators in order of decreasing j, and when i is even these products are formed and accumulated in the other of the accumulators in order of increasing j. Following each of the steps i for which i<m+n−1, i.e. all but the last step, a word Ri of the product R is derived from a lower order part of the selected accumulator, and an accumulated number from a higher order part of the selected accumulator is put into a lower order part of the other accumulator for accumulation with products for the next value of i. Following the last step for which i=m+n−1, the words Rm+n and Ri are derived from respectively higher and lower order parts of the selected accumulator.

Thus numerous modifications, variations, and adaptations may be made to the described embodiment of the invention without departing from the scope of the invention as defined in the claims.

What is claimed is:

1. A method of multiplying two numbers, each represented by a plurality of words each of plurality of bits, in a processor comprising two accumulators, comprising the steps of:
    forming partial products in order of increasing significance by multiplying words of one number by words of the other number;
    accumulating partial products of like significance in an accumulator, the two accumulators being used alternately for consecutive accumulations of partial products of increasing significance; and
    between the consecutive accumulations of partial products using the two accumulators, deriving a word of a product of the two numbers from a lower order part of the most recently used accumulator, and transferring an accumulated number from a higher order part of that accumulator into a lower order part of the other accumulator for accumulation with the partial products of next higher significance.

2. A method as claimed in claim 1 wherein each of the two numbers being multiplied comprises at least about 256 bits in the words representing the number.

3. A method as claimed in claim 1 wherein for accommodating accumulated partial products each accumulator has a capacity greater than twice the size of each word, and the step of transferring an accumulated number from a higher order part of the most recently used accumulator into a lower order part of the other accumulator comprises transferring the accumulated number from two highest order parts of the most recently used accumulator into two lowest order parts of the other accumulator.

4. A method as claimed in claim 3 wherein each of the two numbers being multiplied comprises at least about 256 bits in the words representing the number.

5. A method as claimed in claim 3 wherein the words of each number are stored sequentially in memory, the method further comprising the steps of:
    for sets of accumulated partial products of like significance, incrementing first and second pointers in opposite directions to point to respective memory locations of words of the numbers to be multiplied together to form the respective partial products of like significance; and
    for consecutive accumulations of partial products of increasing significance, changing the directions in which the first and second pointers are incremented.

6. A method as claimed in claim 1 wherein for accommodating accumulated partial products each accumulator comprises a lowest order part for accommodating a lower order word, a higher order part for accommodating a higher order word, and a highest order part for accommodating carries from the higher order part, and the steps of deriving a word of a product and transferring an accumulated number comprise the steps, in sequence, of:
    storing the contents of the highest order part of the most recently used accumulator in the higher order part of the other accumulator and zeroing the remainder of said other accumulator;
    storing the contents of the higher order part of the most recently used accumulator in the lowest order part of the other accumulator and zeroing the higher order part of the most recently used accumulator;
    shifting the contents of the most recently used accumulator right by one bit; and
    shifting the contents of said other accumulator left by one bit, and deriving the word of the product from the lowest order part of the most recently used accumulator.

7. A method as claimed in claim 6 wherein the words of each number are stored sequentially in memory, the method further comprising the steps of:
    for sets of accumulated partial products of like significance, incrementing first and second pointers in opposite directions to point to respective memory locations of words of the numbers to be multiplied together to form the respective partial products of like significance; and
    for consecutive accumulations of partial products of increasing significance, changing the directions in which the first and second pointers are incremented.

8. A method as claimed in claim 1 wherein the words of each number are stored sequentially in memory, the method further comprising the steps of:
    for sets of accumulated partial products of like significance, incrementing first and second pointers in opposite directions to point to respective memory locations of words of the numbers to be multiplied together to form the respective partial products of like significance; and for consecutive accumulations of partial products of increasing significance, changing the directions in which the first and second pointers are incremented.

9. A method of multiplying two numbers, each stored in memory as a plurality of sequential words each of a plurality of bits, in a processor by accumulating in order of increasing significance partial products formed by multiplying words of one number by words of the other number, comprising the steps of:

for sets of accumulated partial products of like significance, incrementing first and second pointers in opposite directions to point to respective memory locations of words of the numbers to be multiplied together to form the respective partial products of like significance; and for consecutive accumulations of partial products of increasing significance, changing the directions in which the first and second pointers are incremented.

10. A method of multiplying a first number X, comprising m words X1 to Xm in order of increasing significance, and a second number Y, comprising n words Y1 to Yn in order of increasing significance, where m and n are integers greater than one, to form a product R comprising m+n words R1 to Rm+n in order of increasing significance, using a processor comprising two accumulators each having a capacity greater than twice the size of each word, comprising the steps of:

in consecutive steps i where i is an integer from 1 to m+n−1:
selecting one of the accumulators when i is odd and the other of the accumulators when i is even; and
forming and accumulating in the selected accumulator all of the products Xj*Yk, where j is an integer from 1 to m, k is an integer from 1 to n, and j+k=i+1, in order of decreasing j when i is odd and in order of increasing j when i is even;

following each of the steps for which i<m+n−1:
deriving a word Ri of the product R from a lower order part of the selected accumulator; and
storing an accumulated number from a higher order part of the selected accumulator in a lower order part of the other accumulator for accumulation with products for the next value of i;

and, following the step for which i=m+n−1:
deriving the words Rm+n and Ri of the product R from respectively higher and lower order parts of the selected accumulator.

11. A method as claimed in claim 10 wherein each step of deriving a word Ri of the product R from a lower order part of the selected accumulator comprises shifting the word in the lower order part of the selected accumulator right by one bit position.

12. A method as claimed in claim 11 wherein each step of storing an accumulated number from a higher order part of the selected accumulator in a lower order part of the other accumulator for accumulation with products for the next value of i comprises shifting the accumulated number left by one bit position.

13. A method as claimed in claim 10 wherein each accumulator comprises a lowest order part for accommodating a lower order word, a higher order part for accommodating a higher order word, and a highest order part for accommodating carries from the higher order part, and the steps of deriving a word Ri of the product R and storing an accumulated number from a higher order part of the selected accumulator in a lower order part of the other accumulator comprise the steps, in sequence, of:

storing the contents of the highest order part of the selected accumulator in the higher order part of the other accumulator and zeroing the remainder of said other accumulator;

storing the contents of the higher order part of the selected accumulator in the lowest order part of the other accumulator and zeroing the higher order part of the selected accumulator;

shifting the contents of the selected accumulator right by one bit; and shifting the contents of said other accumulator left by one bit, and deriving the word of the product from the lowest order part of the selected accumulator.

14. A method as claimed in claim 13 wherein the processor comprises a Motorola DSP56000 digital signal processor.

15. A method as claimed in claim 13 wherein m=12 and n=12.

16. A method as claimed in claim 10 wherein m=n.

17. A method of coding information comprising multiplying two numbers, each represented by a plurality of words each of a plurality of bits, in a processor comprising two accumulators, the multiplication comprising the steps of:

forming partial products in order of increasing significance by multiplying words of one number by words of the other number;

accumulating partial products of like significance in an accumulator, the two accumulators being used alternately for consecutive accumulations of partial products of increasing significance; and between the consecutive accumulations of partial products using the two accumulators, deriving a word of a product of the two numbers from a lower order part of the most recently used accumulator, and transferring an accumulated number from a higher order part of that accumulator into a lower order part of the other accumulator for accumulation with the partial products of next higher significance.

18. A method of coding information comprising multiplying two numbers, each stored in memory as a plurality of sequential words each of a plurality of bits, in a processor by accumulating in order of increasing significance partial products formed by multiplying words of one number by words of the other number, the multiplication comprising the steps of:

for sets of accumulated partial products of like significance, incrementing first and second pointers in opposite directions to point to respective memory locations of words of the numbers to be multiplied together to form the respective partial products of like significance; and for consecutive accumulations of partial products of increasing significance, changing the directions in which the first and second pointers are incremented.

19. A method of coding information comprising multiplying a first number X, comprising m words X1 to Xm in order of increasing significance, and a second number Y, comprising n words Y1 to Yn in order of increasing significance, where m and n are integers greater than one, to form a product R comprising $m+n$ words R1 to $Rm+n$ in order of increasing significance, using a processor comprising two accumulators each having a capacity greater than twice the size of each word, the multiplication comprising the steps of:

in consecutive steps i where i is an integer from 1 to $m+n-1$:

selecting one of the accumulators when i is odd and the other of the accumulators when i is even; and forming and accumulating in the selected accumulator all of the products $Xj*Yk$, where j is an integer from 1 to m, k is an integer from 1 to n, and $j+k=i+1$, in order of decreasing j when i is odd and in order of increasing j when i is even;

following each of the steps for which $i<m+n-1$:

deriving a word Ri of the product R from a lower order part of the selected accumulator; and storing an accumulated number from a higher order part of the selected accumulator in a lower order part of the other accumulator for accumulation with products for the next value of i;

and, following the step for which $i=m+n-1$:

deriving the words $Rm+n$ and Ri of the product R from respectively higher and lower order parts of the selected accumulator.

* * * * *

UNITED STATES PATENT AND TRADEMARK OFFICE
CERTIFICATE OF CORRECTION

PATENT NO. : 5,121,431
DATED : June 9, 1992
INVENTOR(S) : Michael J. Wiener

It is certified that error appears in the above-identified patent and that said Letters Patent is hereby corrected as shown below:

| Col. | Line | |
|---|---|---|
| 1 | 38 | Delete "$T = C^a$ modulo n"; substitute --$T = C^d$ modulo n-- |
| 7 | 17 | Delete "MOVE$_{109}$ X: (RG0)+,X0 $_{102}$ Y: (RG4)+,Y0"; Substitute --MOVE   X: (RG0)+,X0   Y: (RG4)+,Y0-- |
| 7 | 39 | Delete "MPY$_{103}$ X0,Y0,A$_{1012}$ Y: (RG4)-,Y0"; Substitute --MPY   X0,Y0,A   Y: (RG4)-,Y0-- |
| 8 | 46-48 | Delete "MAC$_{103}$ X0,Y0,B$_{104}$ X: (RG0)+,X0 $_{102}$ Y: (RG4)+,Y0"; Substitute --MAC   X0,Y0,B   X: (RG0)+,X0   Y: (RG4)+,Y0-- Delete "MAC$_{103}$ X0,Y0,B$_{104}$ X: (RG0)-,X0"; Substitute --MAC   X0,Y0,B   X: (RG0)-,X0-- |
| 11 | 46 | Before "plurality of bits" insert --a-- |

Signed and Sealed this

Thirty-first Day of August, 1993

Attest:

BRUCE LEHMAN

*Attesting Officer*   *Commissioner of Patents and Trademarks*